Feb. 18, 1941.   C. F. WEBER ET AL   2,231,977
GRINDING MACHINE
Filed Dec. 27, 1937   8 Sheets-Sheet 7
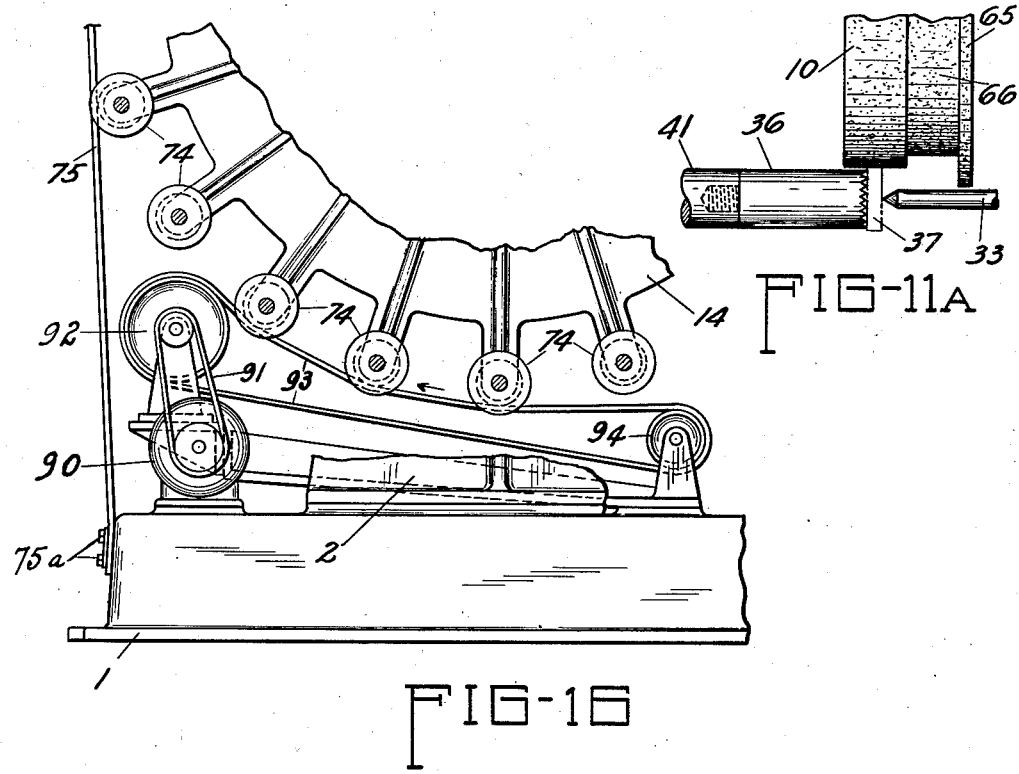
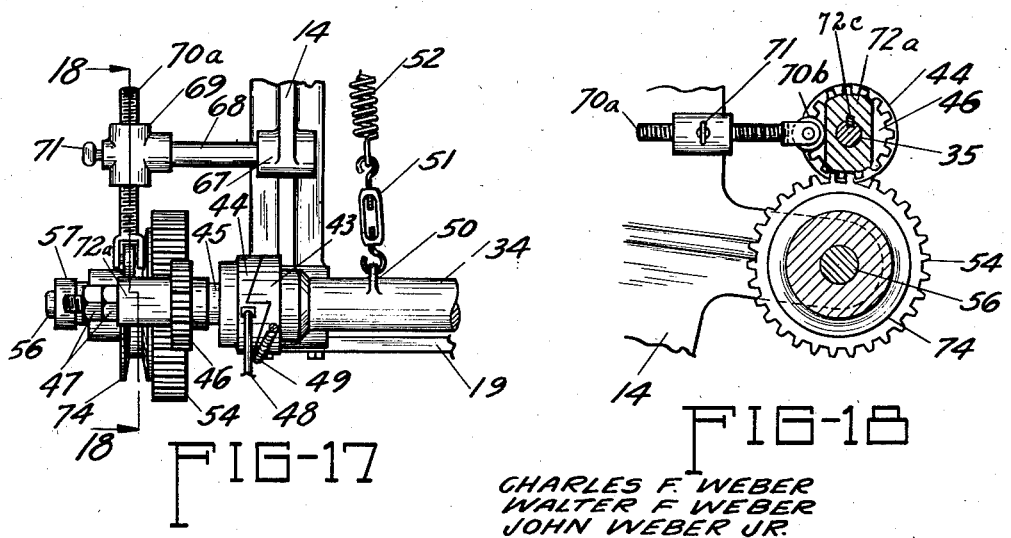
CHARLES F. WEBER
WALTER F. WEBER
JOHN WEBER JR.
EDWARD W. WEBER
LOUIS H. WEBER   INVENTORS.
FRANK H. WEBER
LEONARD G. WEBER
BY
Merrill M. Blackburn
ATTORNEY.

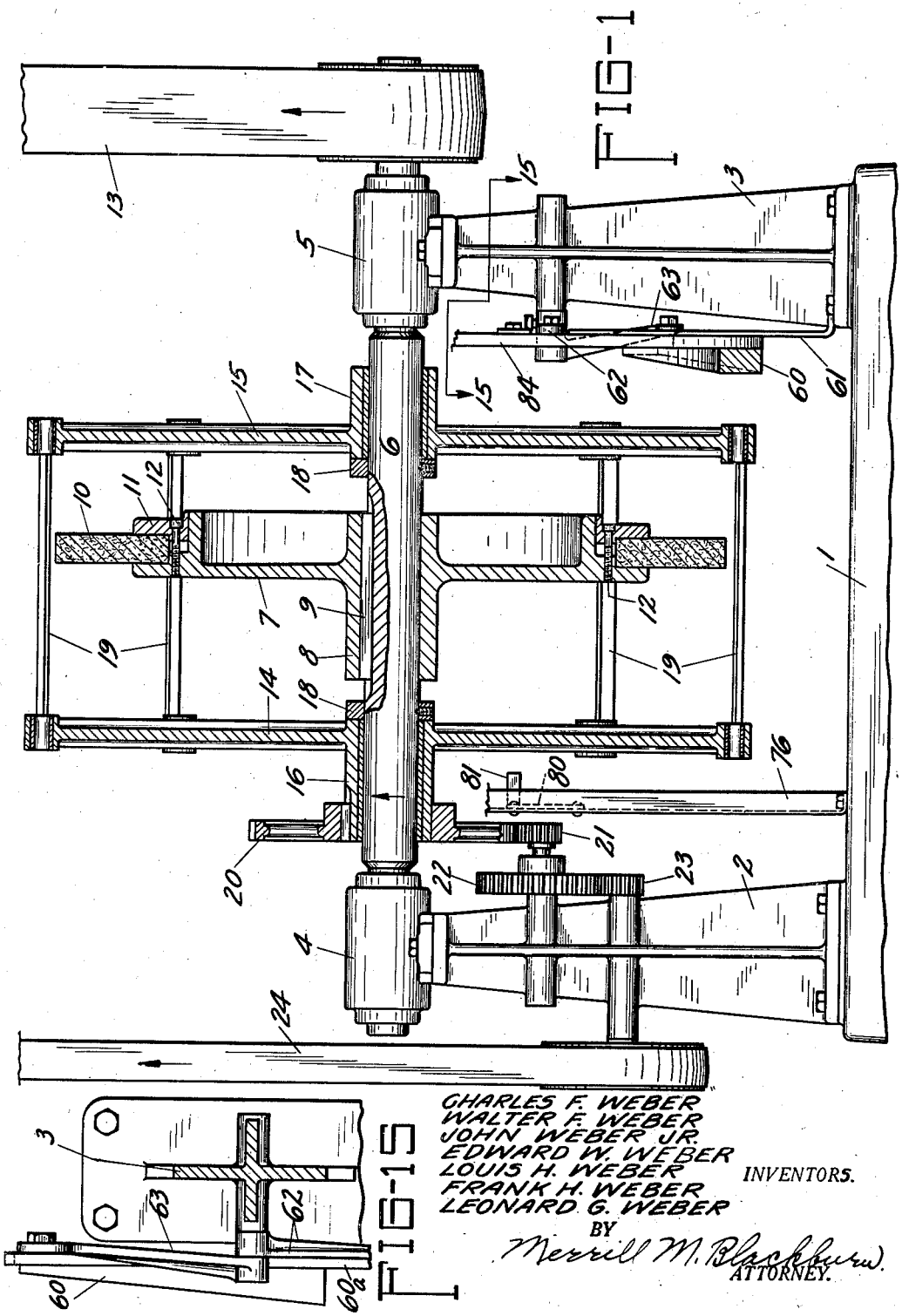

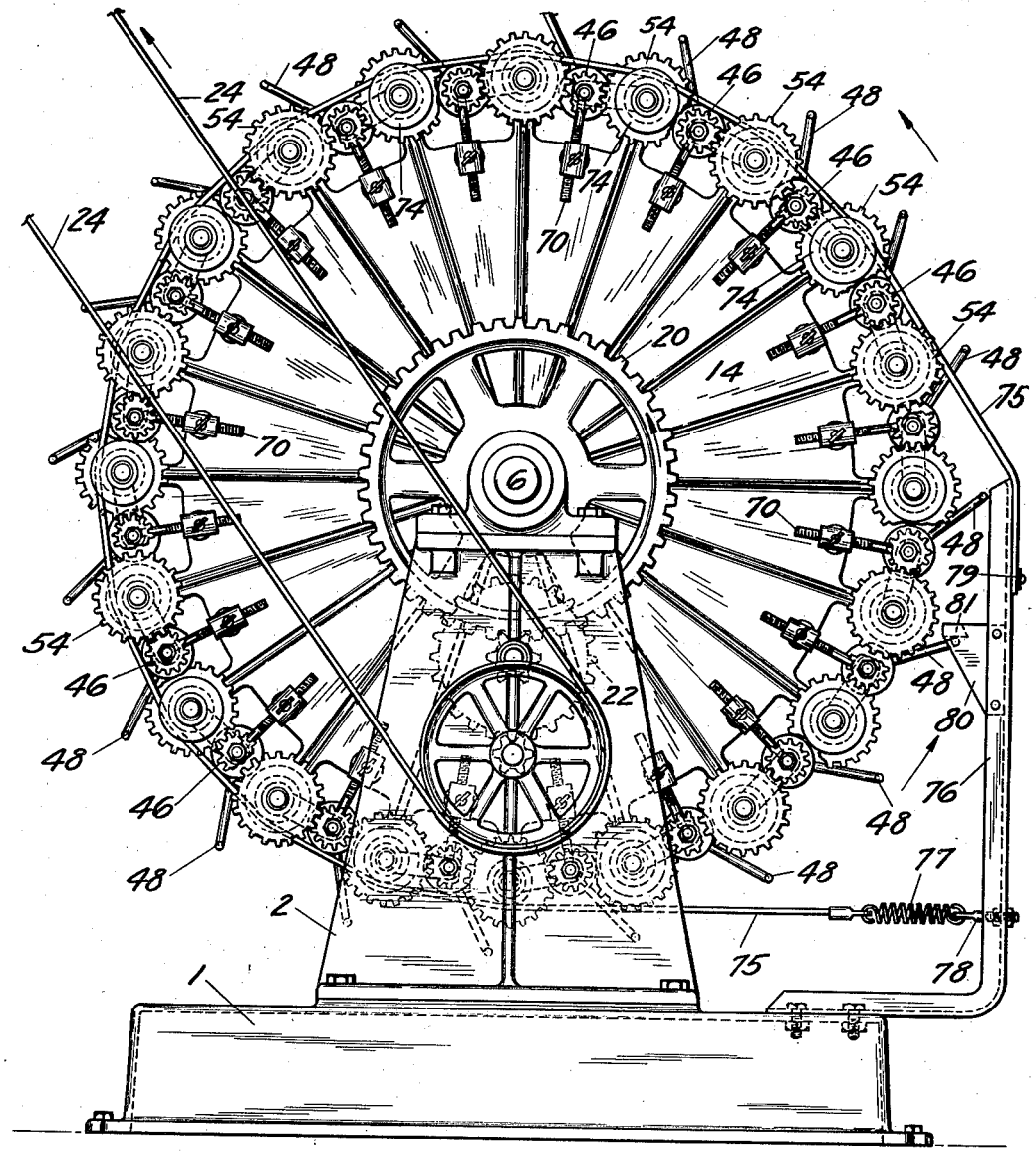

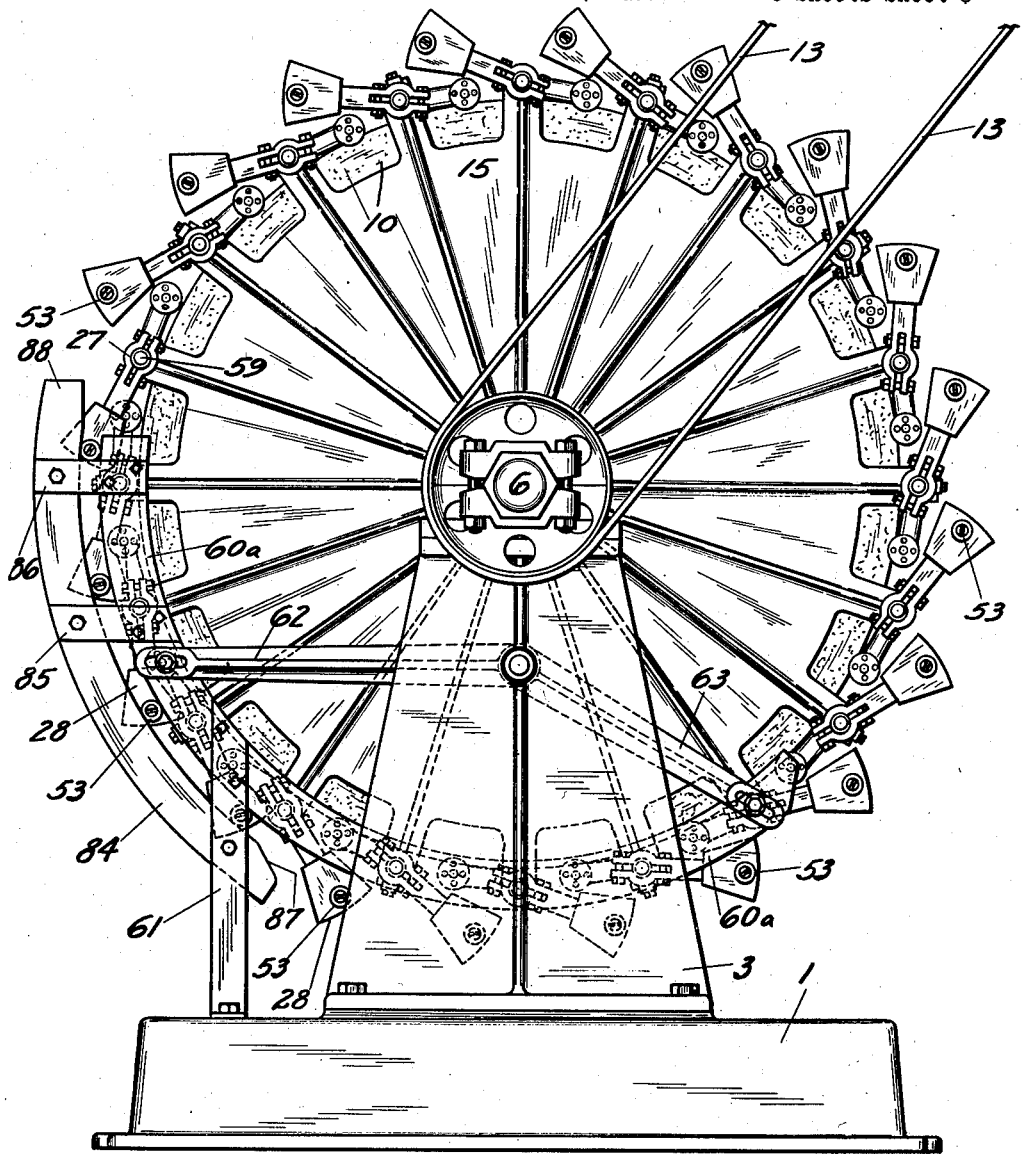

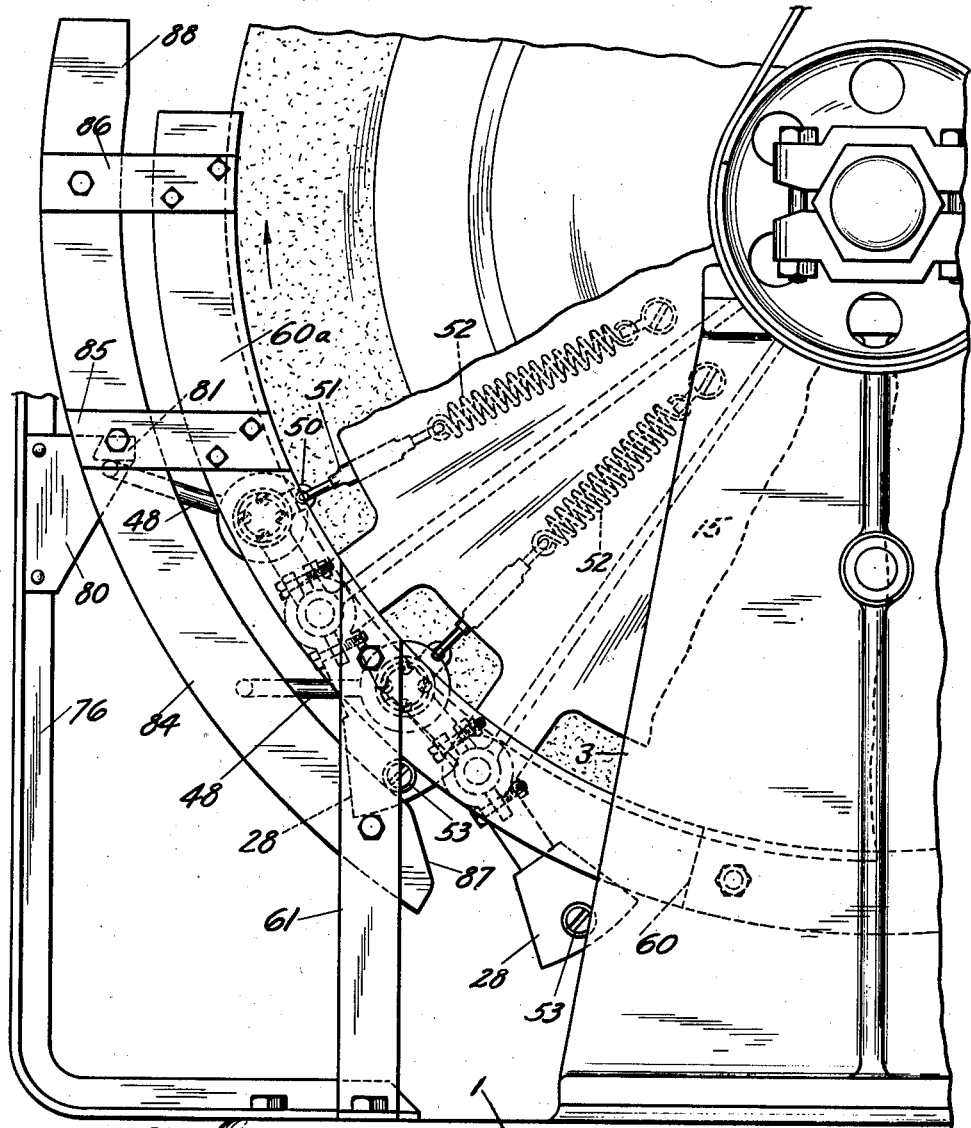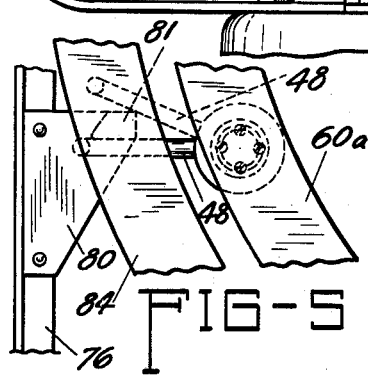

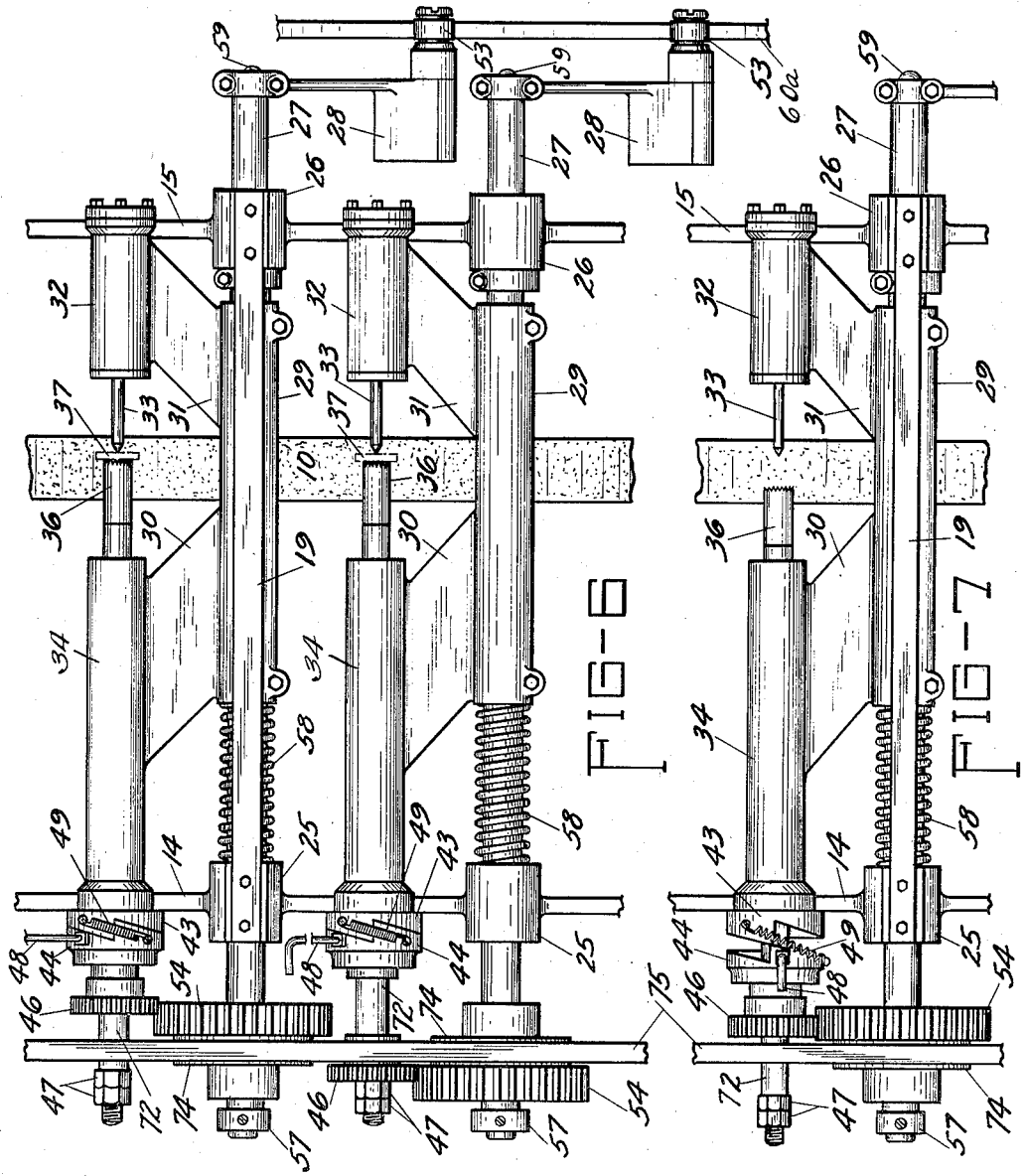

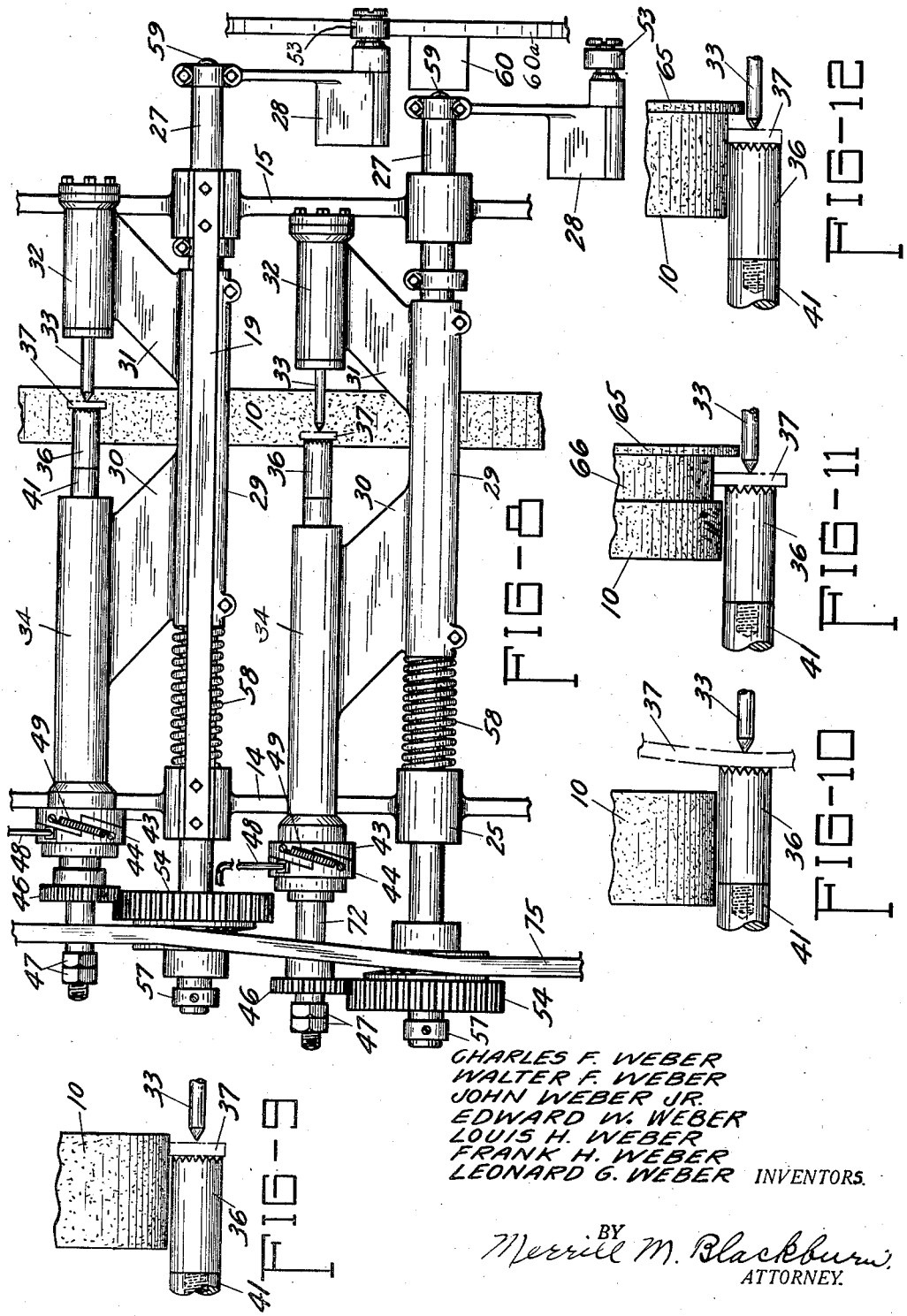

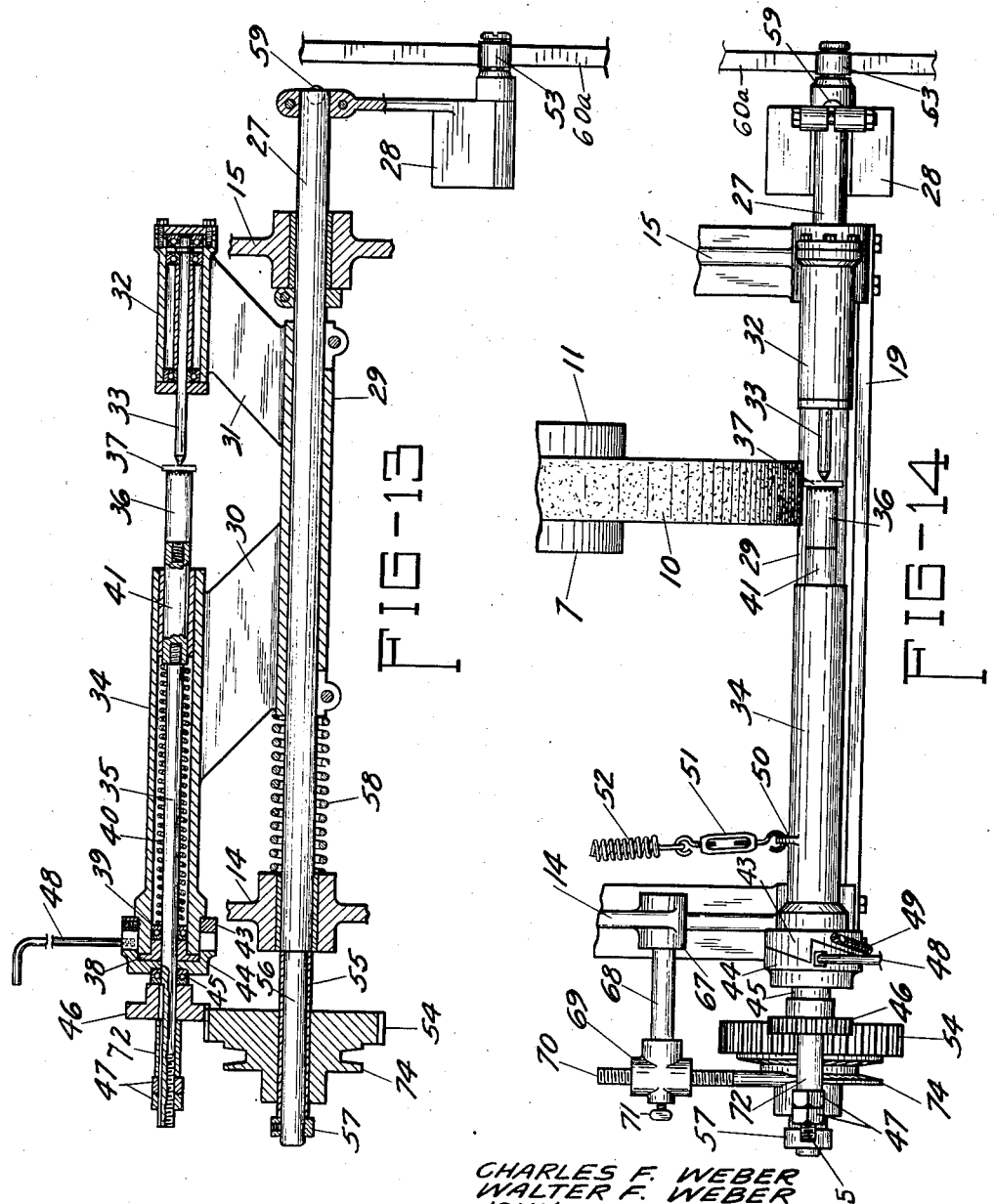

Patented Feb. 18, 1941

2,231,977

UNITED STATES PATENT OFFICE 2,231,977

GRINDING MACHINE

Charles F. Weber, Walter F. Weber, John Weber, Jr., Edward W. Weber, Louis H. Weber, Frank H. Weber, and Leonard G. Weber, Muscatine, Iowa Application December 27, 1937, Serial No. 181,760

14 Claims. (Cl. 51—101)

The present invention relates to grinding machines and more especially to machines for fashioning more or less regular discs or other forms from regular or irregular material. As illustrative of the type of work which the machine shown in the attached drawings is capable of performing, we may refer to the making of button blanks from mollusk shells. This machine may also be used for the shaping of metal forms or objects made from other materials.

Among the objects of this invention are to provide a machine by means of which the production of finished work may be speeded up; to provide a machine which requires a minimum of attention on the part of the operator for the production of a maximum amount of finished product; to provide a machine for the purpose indicated into which the raw material may be put by the operator and then finished blanks may be delivered by the machine without further attention on the part of the operator; to provide a machine for the purpose indicated which functions automatically throughout substantially the entire cycle of its operation; to provide a machine which is readily adjustable for the production of blanks of various sizes; to provide a machine in which blanks of different sizes may be ground simultaneously during any given interval of time; to provide a machine for the purpose indicated which is simple in construction and easy to operate, taking into consideration the amount of work which the machine will do; and such further objects, advantages, and capabilities as will hereafter appear and as are inherent in the construction disclosed herein. Our invention further resides in the combination, construction, and arrangement of parts illustrated in the accompanying drawings and, while we have shown therein what is now regarded as the preferred embodiment of this invention, we desire the same to be understood as illustrative only and not to be interpreted in a limiting sense.

In the drawings annexed hereto and forming a part hereof—

Fig. 1 represents a vertical longitudinal section of the machine with parts omitted for the sake of clearness of illustration;

Fig. 2 represents an elevation taken from the left side of Fig. 1;

Fig. 3 represents a view similar to Fig. 2 but from the opposite side of the machine;

Fig. 4 represents a fragmentary elevation of a part of the structure shown in Fig. 3, on an enlarged scale;

Fig. 5 represents a fragmentary elevation of a part of the structure shown in Figs. 3 and 4;

Fig. 6 represents a front elevation of a fragmentary portion of the machine with certain movable parts in one position of adjustment;

Fig. 7 represents an elevation of the upper half of the structure shown in Fig. 6 with certain parts in a different position of adjustment;

Fig. 8 represents a view comparable to Fig. 6 showing some of the parts in a different position of adjustment;

Figs. 9, 10, 11, and 12 represent fragmentary views of primarily different shapes of grinding wheels for the production of different effects of the grinding operation;

Fig. 11A represents a further stage in the operation of the structure shown in Fig. 11;

Fig. 13 represents a longitudinal section of the structure shown in Fig. 7;

Fig. 14 represents a plan view of the structure shown in Fig. 7 but in the position illustrated in Fig. 6;

Fig. 15 represents a fragmentary horizontal section taken approximately along the broken plane indicated by the line 15—15, Fig. 1;

Fig. 16 represents an auxiliary driving means for rotating the work-holding means;

Fig. 17 represents an alternative construction of stop means for limiting the depth of cut made by the grinding wheel; and Fig. 18 represents a section as if taken along the plane indicated by the line 18—18, Fig. 17.

Reference will now be made in greater detail to the annexed drawings for a more complete disclosure of this invention. On a base 1 are mounted upright supporting standards 2 and 3 which are provided with shaft bearings 4 and 5. In these bearings is rotatably mounted a supporting and actuating shaft or axle 6. A supporting member 7, having a hub 8 which is keyed, as at 9, to the shaft 6, has a grinding member 10 clamped thereto by means of a clamping member 11 and bolts 12. The parts 7 to 12, inclusive, constitute a grinding wheel which is supported and actuated by the shaft or axle 6 which is driven by the belt 13.

Circular, sinuate-edged, plate-like members 14 and 15 are provided with hubs 16 and 17 and are mounted on the shaft 6 to rotate with relation thereto. Rings 18 are secured to the shaft 6 by means of suitable set-screws and are located inwardly of the plates 14 and 15 to prevent endwise shifting thereof with relation to the shaft 6. It will be seen from the foregoing that shaft 6 serves as an axle for the grinding wheel. Bars 19 are bolted to the edges of the members 14 and 15 and hold these parts immovable with relation to each other. A gear 20 is keyed to the hub 16 and driven by a gear 21. The latter gear is driven by gears 22 and 23 and a belt 24. It is apparent that the gears 20 to 23, inclusive, constitute a speed-reduction gearing and that the wheel or cage comprising the parts 14, 15, and 19 will travel much more slowly than the wheel 10, the belts 13 and 24 being driven from the same power shaft.

Bearings 25 and 26 are formed around the peripheries of the plates 14 and 15 and in these bearings are mounted oscillatory rotary shafts 27 which also constitute parts of the cage. Counterweights 28 are clamped to these shafts 27 for a purpose to be discussed presently. Sleeves 29 are clamped to the shafts 27 and oscillate therewith. Arms 30 and 31 extend substantially radially from these sleeves 29 and constitute brackets for supporting work-holding means. On the free ends of the arms 31 are sleeves 32 which serve as supporting means for the work-positioning spindles 33. These spindles are shown as supported in the sleeves 32, rotatably, by means of ball bearings. Sleeves 34 are supported by the arms 30 and serve as supporting and guiding means for the shafts 35, having gripping tools 36 mounted at their ends adjacent the spindles 33. These tools 36 are interchangeable, different sizes being provided for use in grinding different sized blanks, if same should be found desirable. As shown in several of the figures, the work 37 is gripped between the elements 33 and 36, the latter of which is provided with sharpened serrations to engage and hold the work and cause it to rotate.

If it should be desired to adjust the pressure of the tool 36 against the work-piece 37, this may be done by putting in a longer or stronger spring 40 or by putting sleeves of different length around shafts 35, inside of sleeves 34 and between spring 40 and bearing 39 or section 41 of the shaft 35.

A plug 38 closes an end of the sleeve 34 and a ball bearing 39 surrounds the shaft 35 and is pressed against the plug 38 by means of a spring 40 which is compressed between element 39 and the enlarged portion 41 of the shaft 35. Therefore, the tendency of the spring 40 is always to force the tool 36 in the direction of the spindle 33 so as to hold the work between the two. However, means is provided for drawing the shaft 35 toward the left in order to release the work from between the elements 33 and 36 and to permit insertion of other work between these parts. This means comprises a pair of ratchet-faced collars 43 and 44, the former of which is secured to the sleeve 34 by a set-screw and the latter of which presses against a ball bearing 45 which is engaged by a spur gear 46 keyed to the shaft 35. The gear 46 is adjustable lengthwise of the shaft 35 by means of a pair of nuts 47 so as to limit the distance which the tool 36 may travel toward the right and secure just the proper longitudinal adjustment of the parts 35 and 36.

A handle 48 is secured to the collar 44 and is used to cause rotation thereof with relation to the collar 43 so as to cause retraction of shaft 35 and tool 36. Springs 49 connecting the collars 43 and 44 tend to relatively rotate these parts into the closed positions shown in Figs. 6, 8, and 14. Therefore, when a handle 48 is pulled in the direction contrary to the direction of rotation of the cage, its corresponding spring 49 is extended and the shaft 35 is moved toward the left to cause separation of elements 33 and 36.

Eyes 50 are formed on the sleeves 34 and to these are connected adjusting means 51, the latter being connected to springs 52 which are connected to the plate 14. The tendency of these springs 52 is to pull the sleeves 34 inwardly, carrying the elements 33 and 36 toward the grinding wheel 10. This presses the work against the grinding wheel with a yielding pressure, the amount of inward motion being predetermined by adjustment of suitable stops provided for that purpose. This oscillatory movement of the parts 29 to 41, inclusive, causes oscillation of the shafts 27 and counterweights 28. These counterweights are provided for the purpose of balancing the weight of the arms 30 and 31 and the mechanism carried thereby. Rollers 53 are mounted on the counterweights 28 in any suitable manner, as by means of screws.

Gears 54 are tightly mounted on sleeves 55 which are rotatable on the reduced end portions 56 of the shafts 27. It is therefore obvious that these gears 54 may rotate easily with relation to the shafts 27, although they must partake of any longitudinal movement of these shafts because of the fact that the sleeves 55 are held between the shoulders on the shafts 27 and the collars 57. When the shafts 27 and sleeves 29 are moved longitudinally, the relationship of the gears 46 and 54, with respect to each other, is not changed. Almost the entire assembly shown in Fig. 13 is moved bodily, the main portions not moved being the plates 14 and 15. This bodily movement of the sleeves 29 and shafts 27 causes compression of the springs 58, and these springs return the assembly to normal position as soon as the force causing compression of the springs is released.

In the end of each shaft 27 is a ball 59 which rolls on a cam track 60 supported by the arcuate guide member 60a which is secured to the post 61 and positioned by the arms 62 and 63 secured to the upright 3. As shown in Fig. 3, the arcuate guide member is adjustable with relation to the arms 62 and 63 by virtue of the slots in the ends of these arms. The purpose of the cam track 60 is to force the shafts 27 and the mechanism carried thereby toward the left, thus forcing the work to move across the face of the grinding wheel, as illustrated in Fig. 8. It is obvious that the rough grinding operations to bring a shell to the form shown in the upper part of Fig. 8 will cause considerable wear on the right side of the grinding wheel. By moving the work pieces, after they have been initially shaped-out, to the left side of the wheel for finishing, more accurate finishing is possible, as the left side of the wheel does not receive such a great amount of wear.

Fig. 9 illustrates the formation of a blank by performing all of the grinding on the edge of the grinding wheel. Since the hinge of the shell when placed in the work holder for operation in accordance with Fig. 9 extends to the right of the grinding wheel, substantial portions of the shell are cut from the blank and fall off as scrap pieces without power being expended in grinding all the material constituting these pieces into a powder. After the blanks have been roughed out as shown in Fig. 9, they are moved to the left, as above described in connection with Fig. 8, for finish grinding. This type of grinding may well be termed "edge grinding" as the edge of the wheel only is employed in the grinding.

The machine of the present invention is also adaptable to "side grinding" i. e. the roughing out is done on the side face of the wheel. This type of operation is illustrated in Fig. 10 wherein it is illustrated that the shell or other stock is inserted in the work holder 33, 36 at a position to the right of the grinding wheel. To effect grinding of the blank, the stock is worked against the side of the wheel, thus doing most of the grinding against the side of the wheel. When side grinding is performed, the work may be traversed across the face of the wheel as far as may be desired. In order to traverse the work when side grinding is employed, the cam 60 should start to take effect considerably before it does as shown in Figs. 1 and 3. Thus it may start to take effect between the top of upright 76 and the top of the cage, preferably from fifty degrees (50°) to sixty degrees (60°) above a horizontal plane through the axis of the axle 6. From this point, the cam extends approximately two hundred twenty degrees (220°), the cam being sloped substantially its full length, if desired.

In order to keep the springs 52 from drawing the tools 36 against the grinding wheel 10, adjustable stop means are provided which may be independently adjusted for each of the supporting units. Sockets 67 (see Fig. 14) are formed in the plates 14 and these have posts 68 secured therein. Upon the outer end of each post is secured a holding block 69 having a transverse opening for the reception of a screw-threaded stop member 70, held in position by a set-screw 71. Each stop member 70 is adjusted in its block 69 so that the proper sized blank 37 will be produced. The outer end portion of each shaft 35 is surrounded by a sleeve 72 which abuts at one end against the spur gear 46 and is held at its opposite end by the nuts 47. As the springs 52 rock the shafts 27 and the work-holding means carried thereby, the sleeves 72 engage against the ends of the stop members 70 and prevent further rocking under the influence of the springs. If it is desired to form a larger blank, a stop member 70 is screwed out farther so as to hold the tool 36 farther away from the grinding wheel. If it is desired to make a smaller blank, then the stop member 70 is moved in the opposite direction so as to permit the tool 36 to approach nearer to the wheel. If a blank smaller than the end of the tool 36 is desired, then a tool with a smaller diameter is substituted for the tool 36, and this will permit axial adjustment of the stop means 70 so as to bring the axial line of the work-holding means closer to the grinding wheel.

A V-belt pulley 74 is made integral with each spur gear 54 or is secured thereto to rotate therewith. In the present drawings, elements 54 and 74 are shown as being integral. A V-belt 75 is secured to an upright 76 mounted on the base 1. This is shown most clearly in Fig. 2. This V-belt is mounted in the pulleys 74, passes completely around the set and comes back to a spring 77, adjustably secured to the upright 76. Because of the adjustability of the holding member 73, the tension on the belt 75 may be adjusted as desired. If an additional range of adjustment should be desired, this can be secured by having additional holes in the upright 76 for the securing means 79, as will be evident from Fig. 2. Attention is directed to Figs. 6 and 8 from which it is apparent that the gears 54 and 46 are arranged, in pairs, alternately upon opposite sides of the belt 75. However, the pulleys 74 are arranged in line so that the belt 75 may run in a straight line, except as shown in Fig. 8 where it must curve laterally, as the balls 59, engaging the cam track 60, force the work-carrying unit sidewise in carrying the work across the face of the grinding wheel. It will be noted, however, that not all of the pulleys 74 are in engagement with the belt 75. As a matter of fact, there are usually six of these which are out of engagement with the belt and are therefore not being rotated. The other fourteen pulleys 74 are in engagement with the belt and, as the cage is rotated, the pulleys roll along the belt, thus causing rotation of the gears 54. These, in turn, cause rotation of the gears 46 and the tools 36. After a pulley 74 passes the bottom of its course and starts to rise, it leaves the belt 75 and therefore rotates no longer.

A bracket 80 is mounted on the upright 76, near the top thereof, and has an arm 81 projecting laterally (see Figs. 1, 2, 4, and 5) into the path of the arms 48 which serve to open the work-holding means by moving the tool 36 laterally. The forward movement of the cage causes turning of the arm 48 and rotation of the collar 44. When the right-angled projection on the arm 48 passes the projection 81, it is released and the spring 49 causes the collar 44 to rotate about the shaft 35, again bringing the collars 43 and 44 into the position shown in Fig. 6. In this position, the tool 36 is ready to engage work 37, the completed blank having been dropped before the arm 48 was released from the projection 81. As appears from Fig. 4, this happens shortly after the work has passed the lowest point in its course. After ball 59 has passed the end of cam track 60, spring 58 returns the work-holding unit to the position shown in Figs. 13 and 14. When arm 48 has been released from projections 81, the operator may grasp the arm and pull it downwardly, separating the holding means 33 and 36 and rendering possible the insertion of the work-piece to be operated upon. When the work-piece is properly positioned, the operator releases the arm 48, permitting holding member 36 to force the work-piece against the spindle 33. Therefore, when the work-piece is gripped by the tool 36, it is at the extreme right hand side, either as shown in Fig. 10 or as in Figs. 9, 11, and 12.

An arcuate guide 84 is secured to and supported at one end by the upright support 61 and is connected by ties 85 and 86 to the arcuate guide 60a. These arcuate members serve as guides between which the rollers 53 may travel. At its two ends, the arcuate member 84 has beveled surfaces 87 and 88. As the cage moves forwardly, the roller 53 engages the guide 84 and rides up on the inclined surface 87, turning the counterweight about its axis and swinging the work-holding unit away from the grinding wheel. This takes place after the grinding has been completed. The guide 60a prevents the rollers 53 from swinging inwardly when the arms 48 strike the projection 81, while the guide 84 prevents the rollers 53 from swinging outwardly under the influence of the springs 52. When the rollers 53 ride along the beveled surface 88, the work-holder is permitted to swing in toward the grinding wheel, but this movement is limited by the adjustable stops 70, as pointed out above.

It has been stated above that the counterweights 28 are for the purpose of balancing the weight of the arms 30 and 31 and the structures carried thereby. This is not exactly accurate since these counterweights are a little heavier than necessary for that purpose. Therefore, as the work goes up and over the top of the wheel (see Fig. 3), the weights 28 will subtract a little from the pull of the springs 52. On the other hand, as the work goes down on the back side of the wheel, the weights not only do not subtract from the pull of the springs but gradually add thereto to assure contact of the work with the grinding wheel until the grinding is completed.

In Fig. 12 we have shown a modified form of the edge grinding disclosed in connection with Fig. 9. When grinding is done on a flat edge wheel, such as shown in both Figs. 9 and 10, a portion of the hinge is often included within the periphery of the blank and extends to the right thereof as seen in Figs. 9 and 10. The wheel shown in Fig. 12 is provided with a flange 65 at its right edge, so that, after the edge grinding of the blank, the blank may be moved to the right and allowed to rotate in contact with the left side of the flange whereby the hinge portions remaining are removed.

The form of grinding wheel shown in Figs. 11 and 11A is a modification of the wheel shown in Fig. 12 and is provided with a groove 66 in which the material such as a shell is roughed out. After roughing out operations as shown in Fig. 11 are completed, the work may be traversed across the face of the wheel to the left side of the wheel, as shown in Fig. 11A. During the formation of the blank, after it has been roughed out it is moved to the right into contact with the flange 65, in order to remove any remaining hinge portions as described in connection with the device shown in Fig. 12. The provision of a groove in which roughing operations are performed allows the left side of the wheel to be dressed with a diamond so as to have a very regular and accurate surface. To accomplish the shifting of the work against the flange 65, the work is shifted across the grinding wheel by the cam track 60, as above explained, the track being suitably shaped.

In accordance with another form of the present invention, side grinding, as illustrated in Fig. 10, may be combined with edge grinding as illustrated in Fig. 9, the work being ground on both the side and the edge of the wheel. Regardless of whether the simple forms of edge or side grinding illustrated in Figs. 9 and 10 are employed, or a combination of both is employed, substantial savings are effected by minimizing the power expended and the wear of the wheel, and by increasing the rapidity with which the machine may be run, since large portions of the shell are cut away from the blank as pieces and are not ground up.

In the form of the invention shown in Fig. 2, when the work is moved to the left side of the grinding wheel for finishing after the preliminary rough grinding has been accomplished, the work is rotated at the same speed as when rough grinding is being performed. While desirable finishing can be accomplished in this manner, it is preferable to employ an auxiliary drive belt 93 (see Fig. 16) which is effective for increasing the speed of rotation of the blanks during finishing. This belt is driven by motor 90 which, by means of a belt 91, drives a pulley 92, over which the belt 93 passes. The other end of the belt 93 passes over a pulley 94 located forwardly from the support 2. The belt 75 does not come back to the post or upright 76 but is secured to the back part of the base 1, as at 75a, when such an auxiliary belt is employed. By virtue of a proper speed of the motor 90 and ratio of the belt pulleys, the desired speed of rotation of the work may be attained. The cam 60 shifts the work-carrying units laterally for the finishing operations. This lateral shifting brings the pulleys in line with the belt.

In the alternative construction involving side grinding and a cam extending from the upper front side of the machine, around the back, and to the lower front of the machine, when an auxiliary belt is employed it is preferable to have the last 70 to 80 degrees of the cam lie in a plane perpendicular to the axis of the grinding wheel. However, if desired, the cam may slope its entire length and the belt be set parallel to the face of the cam.

*Operation*

To operate the machine, the operator starts the motor (not shown) and this causes driving of the belts 13 and 24 and rotation of the grinding wheel and cage. When the arm or handle 48 is at an elevation aproximately equal to the top of the post 76, the operator grasps this with one hand and a work-piece, for example a shell, with the other. Pulling the arm 48 causes separation of the holding elements 33 and 36. As these separate, the work-piece is inserted between them and properly positioned, and the arm 48 is permitted to rise again under the influence of the spring 49. This should all take place before the roller 53 clears the end of the arcuate member 60a so the work-holding member will not swing outwardly under the force of operator's pull. Now, as the wheel continues to rotate, the roller 53 rolls along the surface 88 and the work-piece is permitted to slowly approach the grinding wheel. When the roller passes the end of the arcuate guide 84, the spring 52 controlling this particular unit pulls the work-piece against the grinding wheel with its full force. As soon as the operator has accomplished this much, he may proceed to insert the next work-piece, as the cage will have advanced far enough by that time for him to do so. He will continue this operation as rapidly as the handles 48 come up to convenient operating position. In course of time, the handle controlling the holding of the first work-piece comes around to the point where it engages the arm 81 and then, as the cage rotates still farther, the elements 33 and 36 are separated automatically, permitting the completed work to drop out. It will be seen from this that the work is very largely automatic, the only manual part being the feeding of the work-pieces to the work-holding members.

As shown in Figs. 17 and 18, a cam may be substituted for sleeves 72 in order to grind forms other than those having circular outline. For example, by using square or oblong cams 72a with rounded corners, work of the same shape will be produced. The same will apply to oval or other shapes. In Figs. 17 and 18, stops 70a take the place of stops 70 and are provided with rollers 70b to engage the faces of the cams 72a and reduce the wear incident to use of the machine. Other forms of wear reducers may be used, such as cam engaging members provided with ball bearings. The cams 72a are secured non-rotatably to shaft 35 by means of keys 72c, as shown in Fig. 18. The keyway for this key is shown also in Fig. 13, but no key is needed in the structure shown in that figure.

In one form of our machine, it is not necessary for the work to move transversely of the grinding wheel and we may, therefore, in this form, dispense with the cam track for engagement by the balls 59.

In Fig. 2, some of the gears 46 and 54 are shown as partly broken away. This is in order not to be confusing because, if shown completely, it would appear from this figure that the gears 46 and 54 are incomplete mesh all the way around the cage. However, it will be seen from Figs. 6 and 8 that this is not true. It is also apparent from these two figures that the purpose in staggering these gears, in pairs, is in order to prevent interference which would take place if the gears were all on the same side of the belt 75.

It will of course be understood that the specific description of structure set forth herein may be departed from without departing from the spirit of this invention as set forth in this specification and the appended claims.

Having now described our invention, we claim:

1. In a grinding machine, supporting means comprising a base and standards rising therefrom; a shaft mounted and rotatable in the standards; a grinding wheel carried and rotated by the shaft; a cage surrounding the grinding wheel and comprising a pair of end plates rotatively mounted on said shaft, tie-rods connecting said plates, and shafts carried by said plates in a circle concentric with the first mentioned shaft; a support rising from the base and carrying a tripping projection; work-holding means carried by the second mentioned shafts, said work-holding means being rotatable and parts being capable of endwise movement, whereby to allow insertion and removal of work; projecting means on said work-holding means to engage said tripping projection, whereby to actuate the work-holding means into releasing position; and mechanism for rotating the work-holding means, whereby to cause presentation of different parts of the work to the grinding wheel to be operated upon.

2. A multiple grinding machine comprising a grinding wheel mounted for rotation on its central axis, means for supporting a plurality of shafts thereabout and rotatable about said wheel, a plurality of shafts supported by said means, a plurality of work-holder units individually mounted to oscillate about said shafts, said units each comprising two coaxial members between which the work is gripped, an arm extending laterally from each of said units which, upon revolution with respect to said units, moves said coaxial members relatively apart, and a fixed stop means arranged to cooperate successively with said units as said units are carried into cooperative association with said stop means to prevent oscillation of said units about said shafts when said arms are revolved.

3. A multiple grinding machine comprising a grinding wheel mounted for rotation on its central axis, means for supporting a plurality of shafts in positions equally spaced from said axis, a plurality of shafts supported by said means, a plurality of work-holders individually supported by said shafts for oscillation thereabout, and means to move said work-holders in series longitudinally of said axis from a position in which the work is axially spaced longitudinally of said wheel to a position in which the work engages a side face of said wheel, and then into a position in which the work-piece with portions ground away engages the edge of the wheel.

4. A multiple grinding machine comprising a grinding wheel mounted for rotation on its central axis, means for supporting a plurality of shafts in positions equally spaced from said axis, a plurality of shafts supported by said means, a plurality of work-holders individually supported by said shafts for oscillation thereabout, means to move said work-holders in series longitudinally of said axis from a position in which the work is axially spaced longitudinally of said wheel to a position in which the work engages a side face of the wheel, and then into a position in which the work-piece with portions ground away engages the edge of the wheel, and means to increase the pressure on the work toward said axis as grinding of the work on the side face of said wheel progresses.

5. A multiple grinding machine for the manufacture of button blanks from shells, comprising a grinding wheel rotatable on its central axis, a plurality of rotatable work-holders disposed about said wheel and mounted for revolution about said axis, and means for so moving said holders with relation to the wheel, that work rotated thereby moves toward said wheel to a position in which the outer portions of the shell are adjacent the side of the wheel and the held portion of the shell is adjacent the edge of the wheel whereby pieces of shell material of substantial size are severed from said held portion and said held portion is properly shaped for a button blank.

6. A multiple grinding machine comprising a grinding wheel rotatable on its central axis, means for supporting a plurality of shafts about said grinding wheel for rotation about said axis, a plurality of shafts carried by said means for revolution about said axis, work-holder assemblies mounted for oscillation on said shafts, each of said assemblies including a work-holder, spring means tending to oscillate said work-holder toward said wheel, said axis being non-vertical so that in one position about said axis the force tending to oscillate said work-holders toward said wheel is greater than in another position about said axis.

7. A multiple grinding machine comprising a grinding wheel rotatable on its central axis, means for supporting a plurality of shafts about said grinding wheel for rotation about said axis, a plurality of shafts carried by said means for revolution about said axis, work-holder assemblies mounted for oscillation on said shafts, each of said assemblies including a work-holder, spring means tending to oscillate said work-holders toward said wheel, said axis being non-vertical so that in one position about said axis the force tending to oscillate said work-holders toward said wheel is greater than in another position about said axis, and cam means positioned about said wheel for limiting motion of said work-holders toward said wheel.

8. A multiple grinding machine comprising a grinding wheel rotatable on its central axis, means for supporting a plurality of shafts about said grinding wheel for rotation about said axis, a plurality of shafts carried by said means for revolution about said axis, work-holders mounted for oscillation on said shafts, counterweights operatively connected to said work-holders, said counterweights being of greater moment about said shafts than said work-holders, and said axis being substantially horizontal so that the force tending to oscillate the work-holders above said axis is less than the force tending to oscillate the work-holders below said axis.

9. In a multiple grinding machine comprising a grinding wheel rotatable on its central axis, means for supporting a plurality of work supports about said wheel for rotation about said axis, a plurality of work supports carried by said means for revolution about said axis, each of said work-supports including a work-holder and a supporting shaft carried by said means, pulleys cooperating with said work-holders individually causing rotation thereof, and a pair of belts for simultaneously driving various of said pulleys at different speeds.

10. In a multiple grinding machine comprising a grinding wheel rotatable on its central axis, means for supporting a plurality of shafts about said wheel for rotation about said axis, a plurality of shafts carried by said means for revolution about said axis, a plurality of work-holders individually supported on said shafts, means connected to said work-holders, and members on said shafts cooperating therewith, to rotate said work-holders upon rotation of said members, pulleys on said shafts to drive said members, and a pair of belts for simultaneously driving various of said members at different speeds.

11. In a multiple grinding machine comprising a grinding wheel rotatable on its central axis, means for supporting a plurality of shafts about said wheel for rotation about said axis, a plurality of shafts carried by said means for revolution about said axis, a plurality of work-holders individually supported on said shafts, means connected to said work-holders, and members on said shafts cooperating therewith, to rotate said work-holders upon rotation of said members, pulleys on said shafts to drive said members, and a pair of belts for simultaneously driving various of said members at different speeds, one of said belts being an endless belt arranged to be driven and to bear against some of said pulleys.

12. In a grinding machine for forming button blanks from bivalve shells, a rotary cage having a supporting and actuating axle, approximately flat ends, oscillative shafts connecting the peripheries of said ends; a grinding wheel mounted for rotation within said cage; gears rotatably mounted on said oscillative shafts; brackets projecting approximately radially from said oscillative shafts; a pointed work-positioning spindle carried by each of said brackets; a shell also carried by each of said brackets in alignment with said spindle; a work-holding tool in each of said shells movable longitudinally thereof; spring means for forcing said tools toward said spindles to cause gripping of a bivalve shell between each tool and spindle; means to cause rotation of each of said tools and thereby effect rotation of the shells gripped thereby; and means for moving the oscillative shafts together with the work-holding spindles and tools longitudinally to carry the shells gripped by said spindles and tools from a position spaced axially from the grinding wheel with respect to said grinding wheel into engagement therewith.

13. A machine for forming button blanks from bivalve shells, comprising a grinding wheel mounted for rotation on its central axis, means for supporting a plurality of shafts thereabout and rotatable with respect to said wheel, a plurality of shafts supported by said means with said shafts substantially parallel to said axis, a plurality of work-holders, each of which is individual to one of said shafts, means on said shafts to support said work-holders spaced laterally therefrom and for oscillation thereabout, said work-holders being arranged to grip a portion of a shell with said gripped portion substantially perpendicular to said axis, and to rotate said shell about the gripped portion, said work-holders being individually movable axially of said wheel, and means to move said work-holders, together with the shells held thereby, from a position in which the shell is out of engagement with said wheel to a position in which the gripped portion of the shell is against the edge of the wheel and the edge portions of the shell are against the side of the wheel and continuing such motion of said work-holders until the edge portions of said shell are cut off in pieces.

14. In a multiple grinding machine comprising a grinding wheel rotatable on its central axis, means for supporting a plurality of work-supports about said wheel for rotation about said axis, a plurality of work-supports carried by said means for revolution about said axis, each of said work-supports including a work-holder and a supporting shaft carried by said means, pulleys cooperating with said work-holders individually causing rotation thereof, a belt for driving said pulleys at one speed for roughing out operations when the pulleys are in positions immediately following a position in which work is placed in the machine, means effective to move the work-holders from a position in which the work is roughed out by said wheel in a direction across the edge face of the wheel to a position for finishing, and a second belt arranged to thereafter engage the pulleys and drive the work-holders at a greater speed than when engaged by the first of said belts.

CHARLES F. WEBER.
      WALTER F. WEBER.
      JOHN WEBER, Jr.
      EDWARD W. WEBER.
      LOUIS H. WEBER.
      FRANK H. WEBER.
      LEONARD G. WEBER.